United States Patent [19]

Duenyas et al.

[11] Patent Number: 5,119,440
[45] Date of Patent: Jun. 2, 1992

[54] METHOD AND APPARATUS FOR PREPARING PICTURE MASKS AND FOR DIGITIZING LINE EDGES

[75] Inventors: Isak Duenyas, Holon; Itai Yad-Shalom, Tel Aviv, both of Israel

[73] Assignee: Scitex Corporation Ltd., HerzeliyahBet, Israel

[21] Appl. No.: 393,742

[22] Filed: Aug. 15, 1989

[30] Foreign Application Priority Data

Nov. 4, 1988 [IL] Israel .................................. 88286

[51] Int. Cl.⁵ .......................................... G06K 9/00
[52] U.S. Cl. ..................................... 382/22; 382/33; 382/48
[58] Field of Search .............. 382/22, 33, 48, 60; 358/96; 364/474.29; 340/796

[56] References Cited

U.S. PATENT DOCUMENTS

| | | | |
|---|---|---|---|
| 4,583,125 | 4/1986 | Yamada | 358/96 |
| 4,783,829 | 11/1988 | Miyakawa | 382/22 |
| 4,884,224 | 11/1989 | Hirosawa | 382/22 |

OTHER PUBLICATIONS

Manfred H. Hueckel "An Operator which Locates Edges in Digitized Pictures", *Journal of the Association for Computing Machinery*, vol. 18, No. 1, Jan. 1971, pp. 113-125.

Primary Examiner—David K. Moore
Assistant Examiner—Yon Jung
Attorney, Agent, or Firm—Benjamin J. Barish

[57] ABSTRACT

A method and apparatus for preparing a mask of an area of interest in a picture to be separated from the remainder of the picture. Data defining a rectangular section of the area of interest enclosing an edge of the picture is inputted into a data processor by specifying the distance between two spaced parallel lines determining the width of the rectangular section, and specifying the starting point and ending point of the rectangular section determining the length of the rectangular section. The inputted data is processed to digitize the edge of the picture enclosed within the rectangular section. The above steps are repeated for the remaining sections of the area of interest to digitize the complete edge of the picture within the remaining sections of the area of interest.

13 Claims, 5 Drawing Sheets

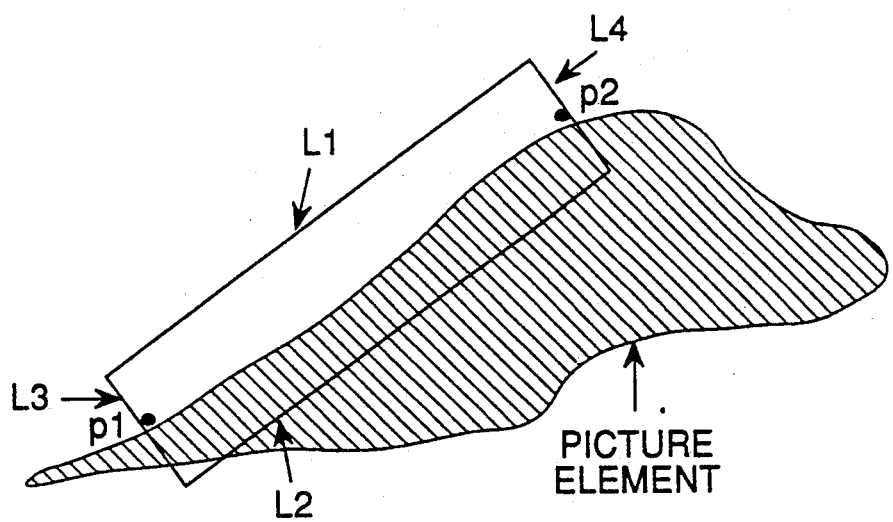
FIG. 2a
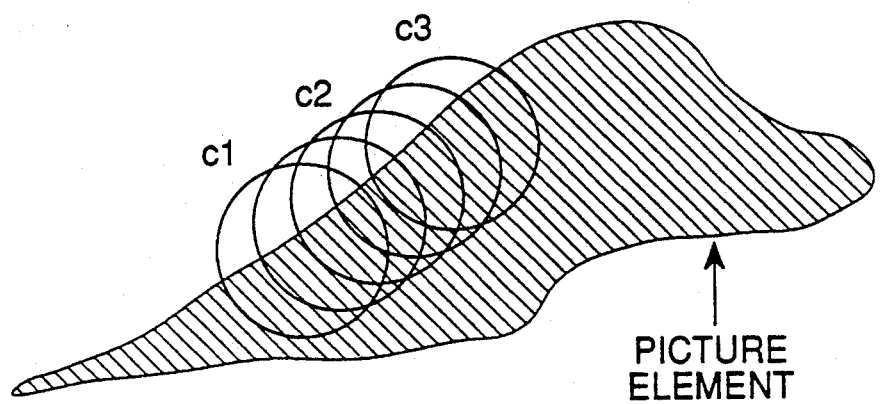
FIG. 2b
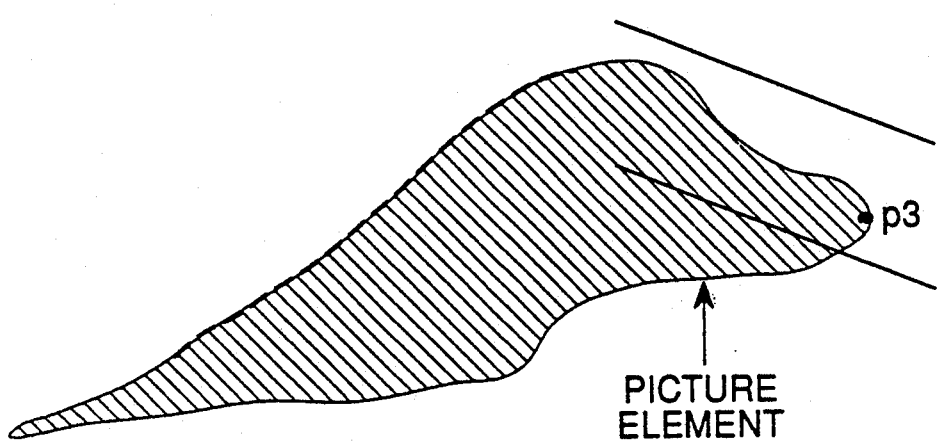
FIG. 2c
FIG. 2

METHOD AND APPARATUS FOR PREPARING PICTURE MASKS AND FOR DIGITIZING LINE EDGES

BACKGROUND OF THE INVENTION

The present invention relates to a method and apparatus for preparing a mask of an area of interest in a picture which area of interest is to be separated from the remainder of the picture. The invention also relates to a technique for digitizing a line edge of a picture particularly useful in the novel mask-preparation method and apparatus.

The purpose of mask preparation is to "cut" an area of interest and to extract it from its background. When cutting a mask, the contour line should be as smooth as possible. In addition, only the area of interest should be in the mask, to ensure that when that area is cut and placed on a different background there is no "noise" resulting from the original background. As a result of the latter requirement, users tend to cut the mask a few pixels within the boundary, or to perform a global framing operation to the whole mask when it is finished.

At the present time, the mask of a multi-color picture is generally prepared manually in the following manner: The separation photograph of the multi-color picture, on which the area of interest is the most obvious, is placed on a light table, and that area is painted with an opaque paint. The resulting film is then photographed to obtain the mask area, which is photographed again together with each separation to obtain the final picture.

In computerized systems, various tools are available for mask preparation. One tool used in mask preparation is the polygon, or smooth mask. In drawing this type mask, the operator draws a precise contour of the masked area. However, this procedure is relatively slow since the operator has to do accurate work. Although speed of the operation increases with the experience of the operator, the contour is only as good as the accuracy of the operator.

Another such tool provides the operator with means to add a pixel to a range of CMYK (cyan, magenta, yellow, black) values that determine the masked pixels. This is a fast and accurate technique, but cannot be used in most cases since the CMYK values of the area of interest within and outside the mask area overlap. In addition, since the resultant mask has only raster information and not vector information its resolution cannot be higher than the original picture. Most of the time masks prepared by this tool need to be retouched for purposes of smoothing the boundaries and cleaning up the resulting mask.

Both of the above tools are used when the picture is displayed in maximum resolution.

It will thus be seen that a mask preparation according to the existing manual procedures is very time consuming particularly if good quality masks are to be produced.

An object of the present invention is to provide a method and apparatus for preparing masks, which method and apparatus enable masks of good quality to be prepared in substantially less time.

BRIEF SUMMARY OF THE INVENTION

According to the present, there is provided a method of preparing a mask of an area of interest in a picture in which the area of interest is to be separated from the remainder of the picture, comprising the steps: storing a digitized representation of the picture; inputting into a data processor data defining a rectangular section of variable width, length and orientation of the stored digitized representation of the picture, which section is a portion of the area of interest and encloses an edge of the picture, by specifying (a) the distance between two variably-spaced parallel lines determining the width of the rectangular section, and (b) the starting point and ending point of the rectangular section determining the length and orientation of the rectangular section; processing the inputted data to digitize the edge of the picture enclosed within the rectangular section; and repeating the steps for each adjacent section the remaining sections of the area of interest to digitize the complete edge of the picture within the remaining sections of the area of interest.

According to another feature in the preferred embodiment of the invention described below, the method includes the further step of also specifying in the inputted data, (c) a predetermined offset margin inside the picture from its determined edge enclosed within the respective rectangular section, the processed inputted data thereby digitizing the line following its actual edge but offset by the predetermined offset margin.

The method is particularly useful wherein the picture is a multi-color picture, in which case the method includes the further step of also specifying, in the inputted data, (d) the color component most prominently showing the edge of the picture in the selected area of interest, the inputted data being processed to digitize the edge of the picture of the specified color component for each of the rectangular sections In one described embodiment, the data defining the rectangular section is manually inputted into the data processor from a workspace buffer storing a digitized representation of the picture of interest In a second described embodiment, the data defining each rectangular section is manually inputted by a hand-held scanner which is scanned across a photographic representation of the picture area of interest.

According to a further feature of the invention, there is provided a method of digitizing a line edge of a picture, comprising: dividing the picture into a plurality of rectangular sections each enclosing an edge of the picture, with each such section being divided into a plurality of pixels; storing the digital value of all the pixels within the respective section; splitting the respective section into a plurality of overlapping circles each of a diameter corresponding to the width of the respective section, each circle overlapping the adjacent circles by at least three pixels; determining the optimal point on each of the circles corresponding to the picture edge; and joining together by a line the optimal points on the middle pixel on each circle.

The invention also provides apparatus for preparing a mask of an area of interest in a picture, and also for digitizing a line edge of the picture, in accordance with the above-described methods.

As will be more apparent from the description below, the method and apparatus of the present invention permit a user to prepare a mask of good quality in a substantially smaller period of time than is needed according to the present techniques of mask preparation.

Further features and advantages will be apparent from the description below.

BRIEF DESCRIPTION OF THE DRAWINGS

The invention is herein described, by way of example only, with reference to the accompanying drawings, wherein:

FIGS. 2a, 2b and 2c pictorially illustrate the technique of mask preparation and also of line digitization in accordance with the present invention;

DESCRIPTION OF PREFERRED EMBODIMENTS

Mask-Cutting Technique of Described Embodiments

Figure 1:
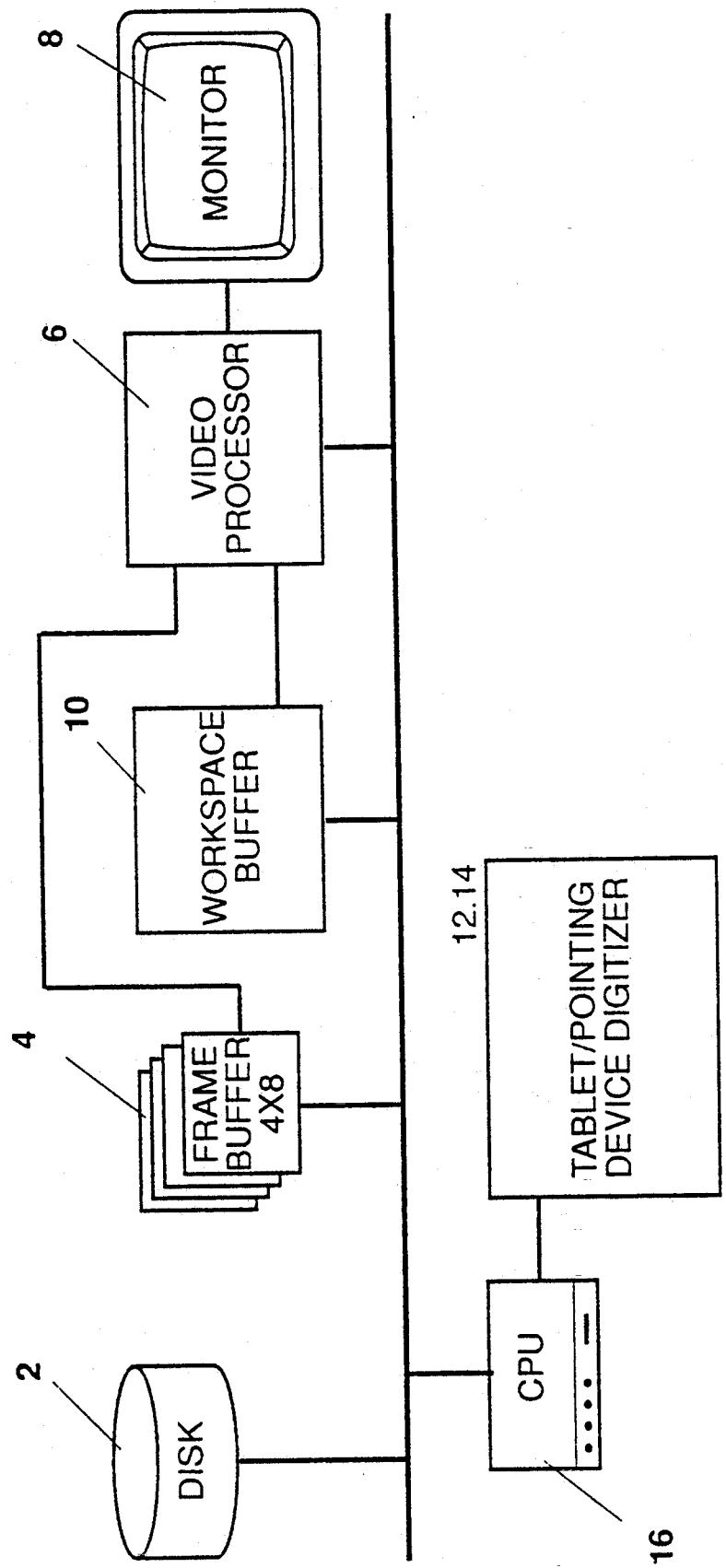
FIG. 1 is a block diagram illustrating one form of apparatus constructed in accordance with the present invention.

The mask-cutting technique of the described embodiment as illustrated in the drawings is basically an edge finding/edge following operation of a particular area of interest in a picture to be isolated as specified by the user. An edge can be defined as a discontinuity in a picture. In the technique of the described embodiment involving a multi-color picture, the color component best showing the edge is specified, and the pixels forming the edge in the specified color component are connected together to form a continuous curve, which curve defines the boundary of the mask.

A number of algorithms have been developed for edge detection. Most are based on gradient or Laplacian calculations, in which a weight is determined for each pixel, which weight is the probability that the pixel is on the edge. A thinning algorithm or a graph search is then performed on those values and the final edge is determined.

The system illustrated in the drawings is based on the "Hueckel" operator technique for edge detection. This is a well-known technique described, for example, in Manfred H. Hueckel "An Operator which Locates Edges in Digitized Pictures", J.ACM.VOL. 18, pp 113-125, January 1971, which is hereby incorporated by reference. The Hueckel operator divides the input area —a circle—into two regions, so that the difference of the weighted averages in the resulting areas is maximum; the straight line separating the two regions is the detected edge in that area. The system described below works with a Hueckel operator since it runs fast enough to be implemented interactively, and since the output is in vectorial form; therefore the process of merging the edge pixels to form a boundary is simplified.

Briefly, in the described embodiment, the user determines the area of interest to be cut by the mask and to be separated from the remainder of the picture, by inputting data defining a rectangular section of the area of interest. FIG. 2a illustrates such a rectangular section of the area of interest of the picture as defined by lines $L_1$–$L_4$; this section encloses the edge of the picture, line $P_1$, $P_2$, within the area of interest. The width of the rectangular section is defined by the distance between the two parallel lines $L_1$ and $L_2$, this width being equal to the length of the two parallel lines $L_3$ and $L_4$, which is specified by first data inputted into the data processor. The length of the rectangular section (namely the lengths and orientation of lines $L_1$ and $L_2$) are defined by second data inputted into the data processor specifying the starting point $P_1$ and the ending point $P_2$ of the rectangular section.

Once the rectangular section illustrated in FIG. 2a is determined, it is divided into circles along its length, overlapping every three pixels, with each circle of a diameter corresponding to the width of the rectangular section (namely the length of lines $L_3$, $L_4$), as illustrated in FIG. 2b. The operator works on each circle to find the optimal edge. These lines are then merged according to an algorithm which joins the middle pixel of each detected line to the previous middle pixel of the previous line, as illustrated in FIG. 2c, to produce a smooth and accurate boundary.

Hardware of Described Embodiment

FIG. 1 is a block diagram illustrating one form of data processor which may be used for implementing the above-described mask-cutting technique.

The data processor system illustrated in FIG. 1 comprises a storage device 2 for storing the multi-color picture in CMYK form, and a frame buffer 4 including four storage devices, each for storing the picture information in C,M,Y and K form, respectively. The system further includes a video processor 6 that enables the user to select one or more color components of the picture, or separations to be displayed on a color monitor 8, the processor converting the CMYK color system to an RGB (red, green, black) system, such that the picture is displayed in the display monitor 8 in RGB form. A workspace buffer 10 is used as the workspace to show the determined edge and the rectangular section of interest. The system further includes an input device 12, in the form of a tablet or pointer (e.g., mouse), a digitizer 14 for digitizing the inputted data, and a CPU (central processor unit) which includes program control means for controlling the overall operation of the data processing system.

The frame buffer 4 includes four identical storage devices for the CMYK separations, each having a capacity to contain at least one color separation of the picture in a zoomed-down form to at least 512×512 pixels. For example, each storage device in the frame buffer 4 may include eight bits for each pixel, to enable each pixel to have a value of 0–255.

The workspace buffer 10 stores the edge of the rectangular section of the picture area of interest as inputted by the operator via input device 12, and also stores the digitized line produced by the CPU 16, which line is displayed in the display monitor 8 after being processed in the video processor 6. The frame buffer 4 could include sufficient storage capacity so as also to serve as the workspace buffer 10.

Software of Described Embodiment

Figure 3:
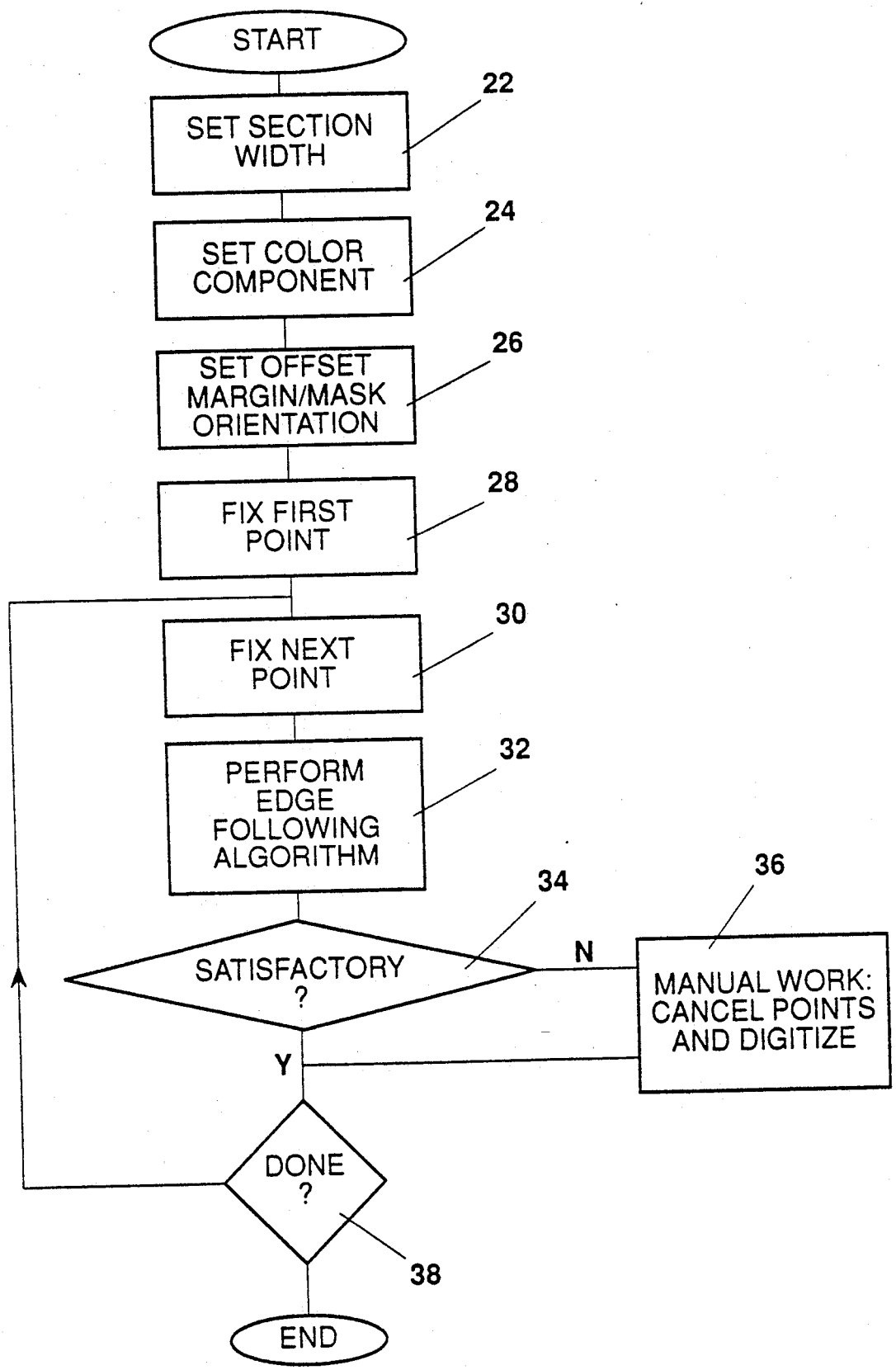
FIG. 3 is a flow diagram illustrating the operation of the apparatus of FIG. 1 for preparing a mask in accordance with the present invention.
Figure 4:
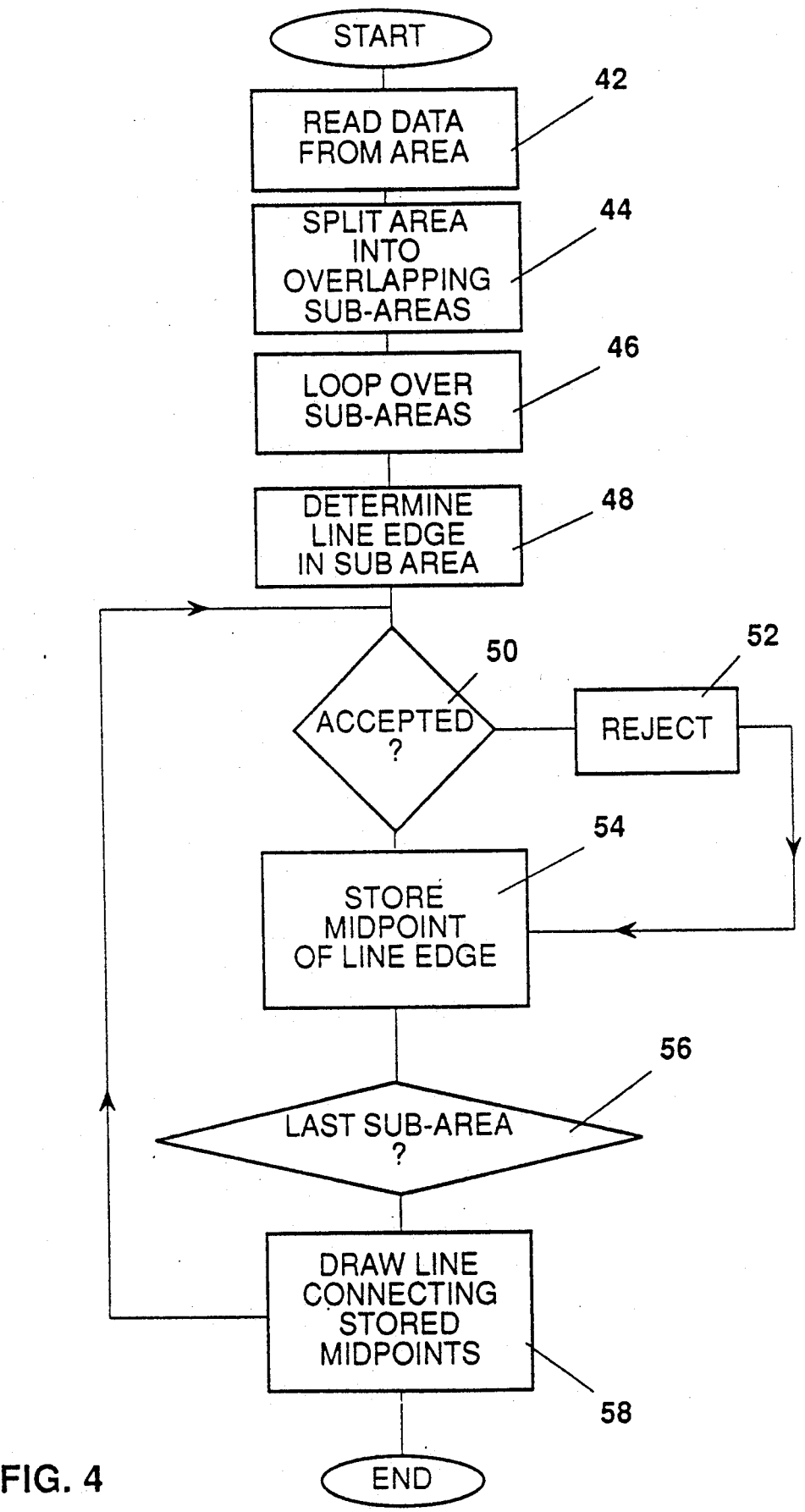
FIG. 4 is a flow diagram illustrating the operation of the apparatus of FIG. 1 for digitizing a line in accordance with the present invention.

FIG. 3 is a flow diagram illustrating the procedure for cutting a mask, in which one of the steps by the CPU is to perform an edge following algorithm, to detect and follow the edge of the picture section; and FIG. 4 is a flow diagram illustrating the algorithm for detecting and following the picture edge.

With respect to the flow diagram illustrated in FIG. 3, the first step (block 22) is to set the width of the section illustrated in FIG. 2a of the area of interest to be cut by the mask. The width of this section is determined by the length of line $L_3$, and is specified by inputting this information via the input device 12 of FIG. 1. For example, the section width may be specified as being five pixels.

Next, the user selects one or more color components to work with (block 24). Thus, if the edge is most prominent in cyan, the user would select the cyan separation. This selection is also made via the input device 12 in FIG. 1. The operator may also choose to work on all the color components together.

The user then specifies a predetermined offset margin inside the picture from its actual edge enclosed within the respective rectangular section (block 26). The actual edge is usually "noisy", and by thus specifying such an offset margin, e.g., three pixels from the edge, more "noise" than data is lost.

The user then fixes (block 28) the first point $P_1$ (FIG. 2a) which specifies the starting point of the rectangular section, and then fixes (block 30) the next point $P_2$, which specifies the ending point of the rectangular section. These two points thereby determine the length of the rectangular section. Both points are specified by their X,Y coordinates, e.g., $X=225$, $Y=125$.

After this data is inputted via the input device 12, the system performs the edge following algorithm (block 32), as controlled by the CPU and as described more particularly below with respect to FIG. 4, to determine the edge of the picture enclosed by the respective rectangular section. This edge is displayed in the display monitor 8 and is checked by the user visually to see whether it is satisfactory (block 34). If not satisfactory this edge or parts of it may be deleted, and the edge of this section may be digitized conventionally, point-by-point; alternately, the process may be repeated with a smaller section.

The user then repeats the same series of steps for the remaining sections of the area of interest in the picture to be cut by the mask, until all the sections of the area of interest have been so processed to produce a complete-closed contour defining the edge of the area of interest to be cut by the mask and to be separated from the remainder of the picture.

As indicated earlier, FIG. 4 illustrates the algorithm or sequence of steps of block 32 in the flow diagram of FIG. 3, for following and digitizing the edge of the area of interest of the picture to be cut by the mask and to be separated from the remainder of the picture.

Thus, the CPU reads the CMYK values of all the pixels enclosed in the selected rectangular section (block 42). The user may have selected only one color, or more than one color, per step 24 in the flow diagram of FIG. 3.

Next, as shown by block 44, the rectangular section is split into a plurality of circular sub-sections, each of a diameter corresponding to the width of the respective section (the length of lines $L_3$, $L_4$, FIG. 2a), with each circular sub-section overlapping the adjacent ones by a predetermined number of pixels, for example three pixels. The CPU then processes each sub-section (block 46) in the following manner:

First, the line edge in the respective sub-area is determined by a line-following algorithm, in this case the Hueckel operator (block 48). The Hueckel operator will also indicate whether the detected edge is accepted as a true edge (block 50), or noise. If the Hueckel operator determines this edge as noise, this data is rejected (block 52), and that sub-section is skipped. In this case, the previous true edge point and the next are joined by a straight line. If the determined line edge in the respective sub-section is accepted as indicating a true edge rather than noise, the CPU stores the midpoint of the line edge (block 54).

The procedure is then repeated for the remaining sub-sections, until the CPU determines that the last sub-section has been processed. At that time the CPU draws a line connecting the stored midpoints of all the so-processed sub-sections (block 58).

It will thus be seen that in any sub-section wherein the processed data is rejected as "noise", that sub-section is skipped, and its value determined by interpolating the points from the values of the two adjacent sub-sections. It has been found that this rejection and filling-in by interpolation produces a line edge which is less influenced by noise.

Figure 5:
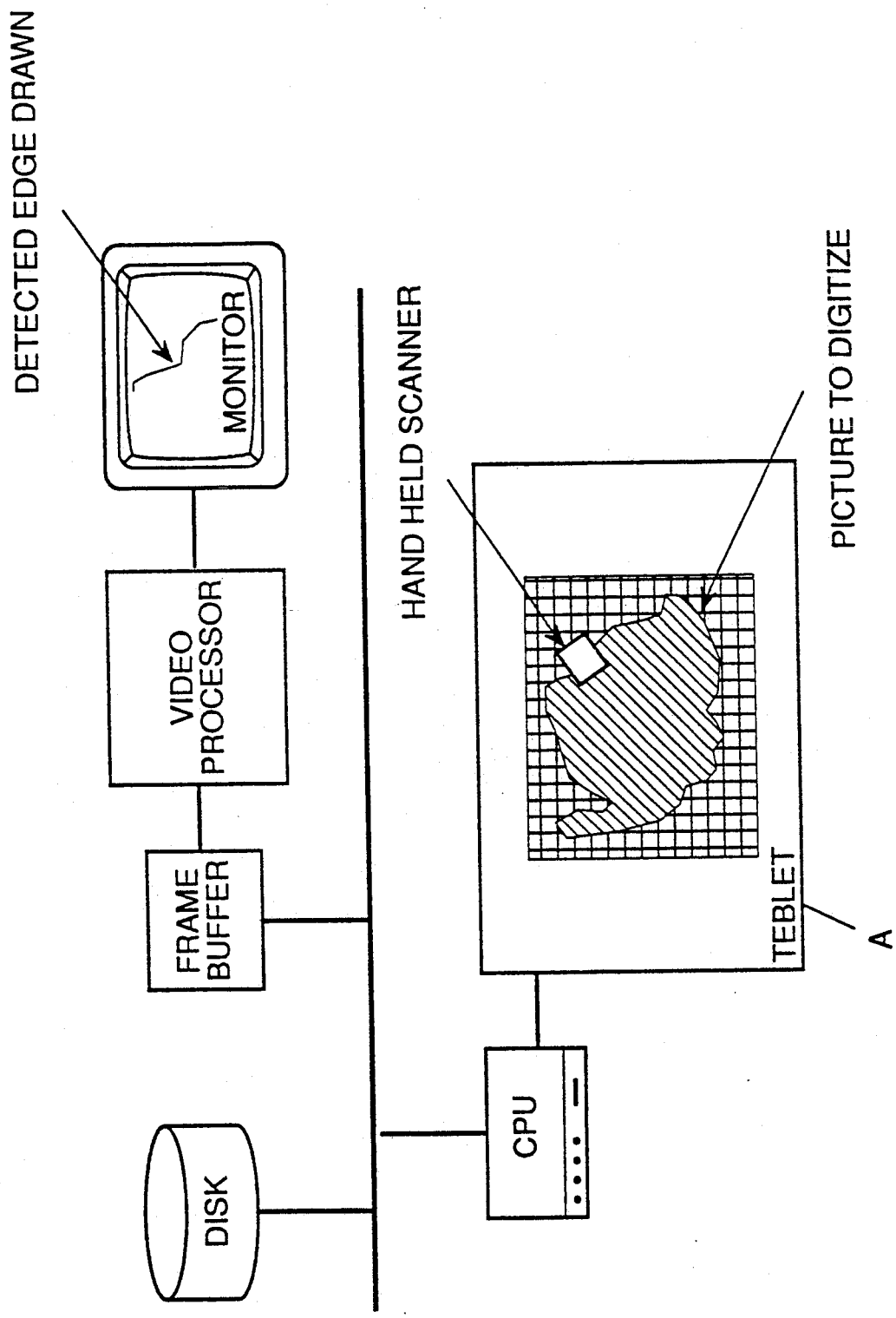
FIG. 5 illustrates a variation including a hand-held scanner for preparing the mask of an area of interest within a picture.

Variation of FIG. 5

FIG. 5 illustrates a variation, wherein the data defining each rectangular section (FIG. 2a) is manually inputted into the data processor, not from a workspace buffer (10) storing a digitized representation of the picture of interest, but rather by a hand-held scanner 60 which is scanned across a photographic representation 62 of the picture of interest. In all other respects, the data is processed as described above in order to draw the line edge of the area of interest of the picture, and to cut a mask of the area of interest to be separated from the remainder of the picture.

It will thus be seen that the above-described method and apparatus provide the user, especially the inexperienced user, with the possibility of making better and faster masks than with the existing methods in most case. Thus, the user may merely point to an approximate area in which he is interested, and does not need to manually follow the edge of the picture. The technique is not dependent on the accuracy of the user, and eliminates the need to do accurate work, as well as the need to perform the "framing" operation in order to avoid noise at the edges.

While the invention has been described with respect to two preferred embodiments, it will be appreciated that many other variations, modifications and applications of the invention may be made.

We claim:

1. A method of preparing a mask of an area of interest in a picture which area of interest is to be separated from the remainder of the picture, comprising the steps of:

storing a digitized representation of the picture;

inputting into a data processor, data defining a rectangular section of variable width, length and orientation of the stored digitized representation of the picture, which section is a portion of the area of interest and encloses an edge of the picture, by specifying (a) the distance between two variably-spaced parallel lines determining the width of the rectangular section, and (b) the starting point and ending point of the rectangular section determining the length and orientation of the rectangular section;

processing said inputted data to digitize the edge of the picture enclosed within said rectangular section;

and repeating said inputting and processing steps for the remaining sections of the area of interest to digitize the complete edge of the picture within said remaining sections of the area of interest.

2. The method according to claim 1, including the further step of also specifying, in the inputted data, (c) a predetermined offset margin inside the picture from its actual edge enclosed within the respective rectangular section, the processed inputted data thereby digitizing the line following its actual edge but offset by said predetermined offset margin.

3. The method according to claim 2, wherein said picture is a multi-color picture, said method includes the further step of also specifying, in the inputted data, (d) the color component most prominently showing the edge of the picture in the selected area of interest, the inputted data being processed to digitize the edge of the picture of the specified color component for each of said rectangular sections.

4. The method according to claim 1, wherein said digitized representation of the picture is stored in a workspace buffer in the data processor.

5. The method according to claim 1, including the further step of displaying said complete edge of the picture.

6. The method according to claim 1, wherein said inputted data is processed to digitize the edge of the picture enclosed with each rectangular section by:
dividing the respective section into a plurality of pixels;
storing the digital value of all the pixels within the respective section;
splitting the respective section into a plurality of overlapping circles each of a diameter corresponding to the width of the respective section, each circle overlapping the adjacent circles by at least three pixels;
determining the optimal point on each of the circles corresponding to the picture edge;
and joining together by a line said optimal points on the middle pixel on each circle.

7. A method of digitizing a line edge of a picture comprising:
dividing the picture into a plurality of rectangular sections each enclosing an edge of the picture, with each such section being divided into a plurality of pixels;
storing the digital value of all the pixels within the respective section;
splitting the respective section into a plurality of overlapping circles each of a diameter corresponding to the width of the respective section, each circle overlapping the adjacent circles by at least three pixels;
determining the optimal point on each of the circles corresponding to the picture edge;
and joining together by a line said optimal points on the middle pixel on each circle.

8. Data processing apparatus for preparing a mask of an area of interest in a picture which area of interest is to be separated from the remainder of the picture, comprising:
means for storing a digitized representation of the picture;
input means for inputting first data and second data;
programmed control means for determining:
(a) from said first inputted data, the distance between two variably-spaced parallel lines to define the width of each one of a plurality of rectangular sections of variable width, length and orientation of the stored digitized representation of the picture, with each section being a portion of the area of interest, and
(b) from said second inputted data, the starting and ending points of each rectangular section;
processing means for digitizing the edge of the picture enclosed by each one of said rectangular sections;
and display means for displaying the digitized edges of all said plurality of sections of the area of interest.

9. The apparatus according to claim 8, wherein said input means also including means for inputting third data; said programmed control means determining, from said inputted third data, a predetermined offset margin inside the picture from its actual edge enclosed within the respective rectangular section such that the lines digitized by said digitizer means follow the actual edge in the respective rectangular section but offset by said predetermined offset margin.

10. The apparatus according to claim 8, wherein said picture is a multi-color picture, said input means also permitting inputting further data specifying the color component most prominently showing the edge of the picture in the selected area of interest, such that the line digitized by said digitizer means in each rectangular section corresponds to the edge of the picture of the specified color component.

11. The apparatus according to claim 8, wherein said data processor further includes a workspace buffer storing a digitized representation of the picture from which said mask of the area of interest is prepared.

12. The apparatus according to claim 8, wherein said programmed control means comprises:
means dividing each section of the area of interest to be measured into a plurality of pixels;
means storing the digital value of all the pixels within the respective section;
means splitting the respective section into a plurality of overlapping circles each of a diameter corresponding to the width of the respective section, each circle overlapping the adjacent circles by at least three pixels;
means determining the optimal point on each of the circles corresponding to the picture edge;
and means joining together by a line said optimal points on the middle pixel on each circle.

13. Apparatus for digitizing a line edge of a picture including a data processor having programmed control means comprising: means dividing the picture into a plurality of rectangular sections each enclosing an edge of the picture, with each section being divided into a plurality of pixels;
means storing the digital values of all the pixels within the respective section;
means splitting each section into a plurality of overlapping circles each of a diameter corresponding to the width of the respective section, each circle overlapping the adjacent circles by at least three pixels;
means determining the optimal point on each of the circles corresponding to the picture edge;
and means joining together by a line said optimal points on the middle pixel on each circle.

* * * * *